United States Patent Office 3,202,670
Patented Aug. 24, 1965

3,202,670
9 - METHYL - 3,4 - DIHYDROXY - 9H - PYRIDO-[3,4-b]INDOLE METHOCHLORIDE
Jacob Szmuszkovicz, Kalamazoo, Mich., assignor to The Upjohn Company, Kalamazoo, Mich., a corporation of Delaware
No Drawing. Filed Nov. 6, 1963, Ser. No. 321,685
1 Claim. (Cl. 260—296)

This invention relates to a novel indole derivative.

The compound of this invention is 9-methyl-3,4-dihydroxy-9H-pyrido[3,4-b]indole methochloride of the formula

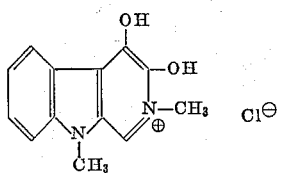

The product of this invention is named in accord with the basic structure having positions numbered as follows

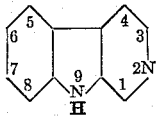

The compound of this invention demonstrates significant monamine oxidase-inhibiting activity and can be administered to humans and animals as the primary active ingredient of conventional pharmaceutical forms such as tablets, capsules, elixirs, injectable solutions and suspensions and the like for treatment of mental depression. This compound is also a potent anorexigenic and anti-inflammatory agent.

In preparing the product of this invention the known N,1-dimethylindole-2-carboxamide is reduced to 1-methyl-2-methylaminomethylindole, which is then reacted with oxalyl chloride to give the desired 9-methyl-3,4-dihydroxy-9H-pyrido[3,4-b]indole methochloride. It is preferred to employ at least two molecular equivalents of oxalyl chloride per molecular equivalent of 1-methyl-2-methylaminomethylindole.

The following preparation and example illustrate the synthesis of the product of this invention but are not to be construed as limiting the scope thereof.

PREPARATION 1

*1-methyl-2-methylaminomethylindole*

A solution of N,1 - dimethylindole - 2 - carboxamide (37.6 gm., 0.2 mole) in 300 ml. of benzene was added to a solution of lithium aluminum hydride (37.6 gm.) in 1 liter of ether over a period of 45 minutes. The mixture was then refluxed for 5 hours and allowed to stand overnight. It was decomposed in succession with 38 ml. of water, 38 ml. of 15% sodium hydroxide and 114 ml. of water. After stirring for one-half hour at room temperature, the suspension was filtered and the cake was washed with ether. The filtrate was dried over sodium sulfate and evaporated to give 35. 3 gm. of 1-methyl-2-methylaminomethylindole as an oil which showed no residual amidic band in the infrared. A sample of the oil in ether was converted to the hydrochloride with ethereal hydrogen chloride. It melted at 237.5–238.5° C., after crystallization from methanol. Ultraviolet spectrum (ethanol) showed λmax. 218 (38,950); 272 (8,600); sh 284 (7,250); sh 296 (3,800). Infrared spectrum (mineral oil mull) showed salt: 2760, 2700, 2480, 2440; C=C: 1595, 1550, 1535.

Analysis.—Calcd. for $C_{11}H_{15}ClN_2$: C, 62.69; H, 7.18; Cl, 16.83; N, 13.30. Found: C, 62.62; H, 7.27; Cl, 16.81; N, 13.01.

EXAMPLE 1

*9-methyl-3,4-dihydroxy-9H-pyrido[3,4-b]indole methochloride*

Oxalyl chloride (6.9 ml., 0.08 mole) was added during 5 minutes to a solution of 1-methyl-2-methylaminomethylindole (3.48 gm., 0.02 mole) in 100 ml. of benzene. The mixture became warm and an oil appeared. It was then refluxed for 2 hours. The resulting suspension was filtered and the solid washed with benzene to give 3 gm., M.P. 220–240° C. (dec.). Crystallization from 50 ml. of dimethylformamide afforded 0.86 gm. of desired product (16% yield), M.P. 274–275° C. (dec.). Recrystallization from methanol gave small yellow needles of the same M.P. Ultraviolet spectrum (ethanol) showed λmax. 213 (21,950); sh 223 (15,100); 258 (21,000); sh 292 (3,780); 340 (6,300); 415 (2,580). Infrared spectrum (mineral oil mull) showed $N^+Cl^-$: 2595; C=C 1655

Analysis.—Calcd. for $C_{13}H_{13}ClN_2O_2$: C, 58.98; H, 4.95; (w), 1610 (w), 1515.
Cl, 13.39; N,10.59; active H: 2. Found: C, 59.30; H, 4.79; Cl, 12.58; N, 10.52; active H: 2.36.

What is claimed is:
9-methyl-3,4-dihydroxy-9H-pyrido[3,4-b]indole methochloride of the formula

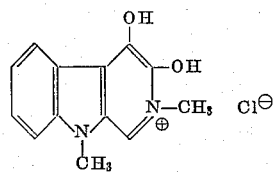

No references cited.

WALTER A. MODANCE, *Primary Examiner.*